UNITED STATES PATENT OFFICE.

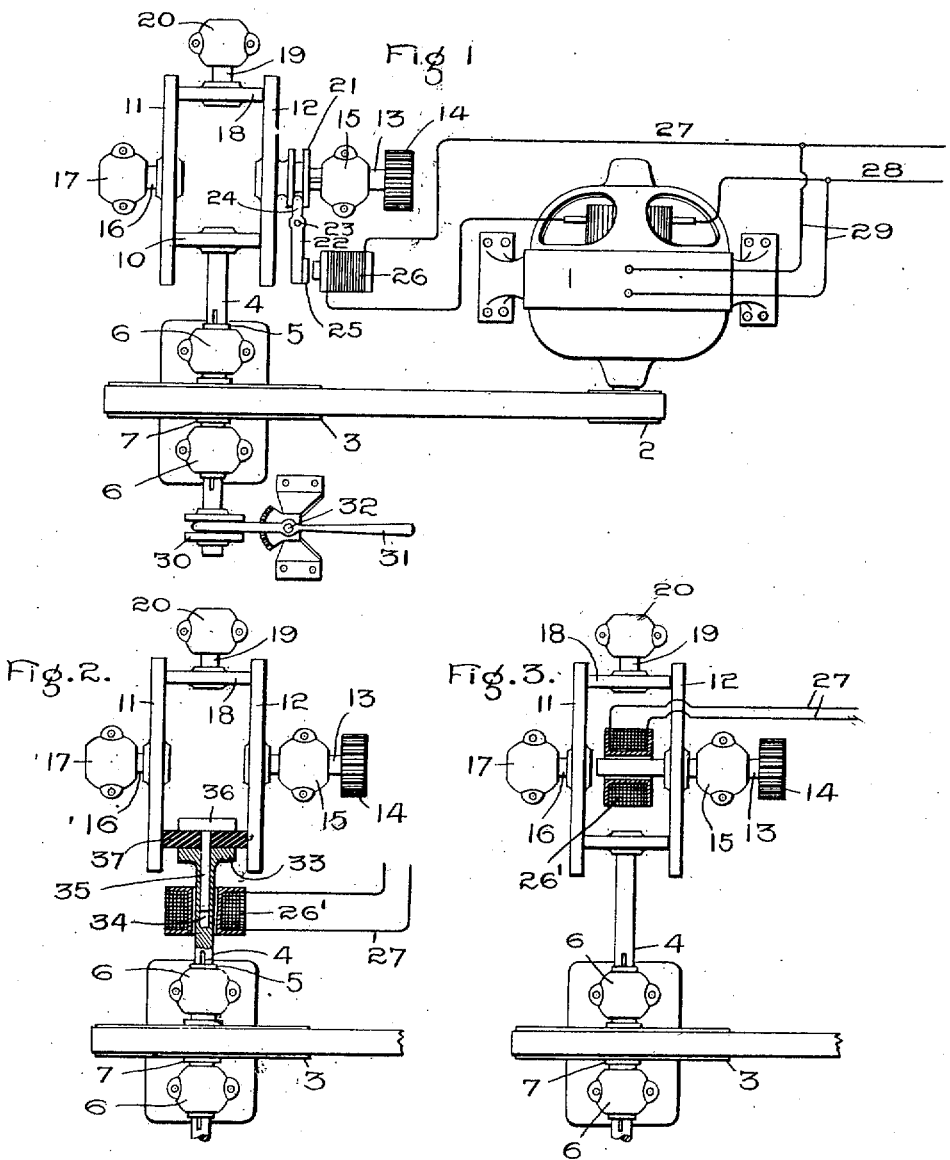

ALEXANDER CHURCHWARD, OF PELHAM, NEW YORK, ASSIGNOR TO GENERAL ELECTRIC COMPANY, A CORPORATION OF NEW YORK.

POWER-TRANSMISSION DEVICE.

No. 849,051.   Specification of Letters Patent.   Patented April 2, 1907.

Application filed September 6, 1902. Serial No. 122,382.

*To all whom it may concern:*

Be it known that I, ALEXANDER CHURCHWARD, a citizen of the United States, residing at Pelham, county of Westchester, State of New York, have invented certain new and useful Improvements in Power-Transmission Devices, of which the following is a specification.

In friction-gearing, such as the ordinary speed-regulating device, consisting of a large disk driving or driven by a smaller one at right angles to the large disk, the pressure between the contacting surfaces of the disks, if unvarying, must be made sufficiently great to prevent slipping at the heaviest load carried. As a result of this the friction at light loads is greater than is necessary and the efficiency thereby lowered.

The object of my invention is the production of means whereby the pressure between friction-gearing will be automatically varied in accordance with the load.

In the accompanying drawings, Figure 1 illustrates one embodiment of my invention. Fig. 2 is a view, partly in section, illustrating a somewhat different form, while Fig. 3, also partly in section, illustrates a third form.

In Fig. 1 a direct-current shunt-wound electric motor 1 of ordinary construction is shown. The driving-shaft of the motor carries a pulley 2, which is belt-connected to a pulley 3, mounted on the shaft 4. The pulley 3 is rigidly connected to a sleeve 5, which is rotatably held in the journal-boxes 6. Collars 7 are formed on the sleeve and are located between the bearings 6, thus preventing end play of the pulley. The sleeve 5 is splined to the shaft 4 in such manner that the two turn together, but are capable of movement longitudinally of one another.

A disk 10 is rigidly mounted at one end of the shaft 4 between a pair of parallel disks 11 and 12, which have their axes in line with one another and at right angles to the shaft 4. The disk 12 is rigidly secured to one end of a shaft 13. The other end of the shaft 13 carries a spur-gear 14 or other suitable connection for driving the mechanism which is to be operated by the motor. Intermediate the disk 12 and the gear 14 the shaft 13 is supported in a suitable bearing 15. The disk 11 is secured to the end of a stub-shaft 16, which is mounted in a bearing 17. A disk 18, carried by a stub-shaft 19, is supported in the bearing 20 and is also placed between the disks 11 and 12, with its axis in line with the axis of the disk 10. The disks 11 and 18 are idlers and are used merely to prevent lateral stress on the shafts 4 and 13. The disks 10 and 18 may be made of paper, while the disks 11 and 12 may be made of cast-iron. Other suitable materials can be employed.

Rigidly secured to the shaft 13 between the disk 12 and journal-box 15 is a grooved wheel 21. A lever 22, perpendicular to the shaft 13, is pivoted at 23 and is placed with one end 24 engaging the walls of the grooved disk 21. The other end of this lever is placed in front of the electromagnet 26 and carries an armature 25 to be attracted by the electromagnet. The electromagnet 26 is placed parallel to the shaft 13, and its coils are located in the current-carrying line 27. The lines 27 and 28 supply current to the armature of the motor. Lines 29 carry current to the field of the motor.

A grooved disk 30 is mounted on the end of the shaft 4 opposite to that carrying the disk 10. A lever 31, pivoted at 32 to the framework of the machine, has one end in engagement with the disk 30. The lever 31 and disk 30 form means for adjusting the shaft 4 endwise to vary the relative speeds of the shafts 4 and 13.

The operation of the construction described is as follows: The rotation of the motor-shaft through the pulleys 2 and 3 rotates the shaft 4. This by means of the disks 10 and 12 turns the shaft 13. The speed at which the shaft 13 is turned varies inversely with the distances of the disk 10 from the axial center of the shaft 13. The passage of the current through the motor-armature energizes the electromagnet 26, which in turn attracts the armature 25 and tends to turn the lever 23 about its pivot. The pressure between the disks 10 and 12, which was originally very slight, is thus increased. The force with which the armature 25 is attracted, and hence the pressure between the disk 12 and the disk 10, increases with the current in the line 27. The current in turn, however, varies with the load upon the motor-shaft, as is well known to those skilled in the art. It readily follows, therefore, that the pressure between the disks 10 and 12 varies with the load upon the motor-shaft.

In the construction shown in Fig. 2 the shaft 1 is provided at its inner end with a small integral disk 33 and has an axial opening 34 formed in its end. In this axial opening or channel a guiding stem or pin 35 is placed. To the outer end of the pin 35 is rigidly secured a disk 36, similar in size to the disk 33. Between the disks 33 and 36 a disk 37, of yielding material, is placed. The disk 37 may be made out of rubber or other suitable material and is rigidly secured to the disk 33. In this form the coils 26' surround the shaft 4, which turns in them. The coils are located adjacent the disk-bearing end of the shaft 4, the end of the pin 35 being located about midway of the coils.

On the passage of the motor-current through the line 27 and the energization of the electromagnet 26' the disks 33 and 36 are drawn toward one another. This compresses the elastic disk 37, and hence enlarges its diameter. As a result in this case also the friction between the disk 37 and the disk 12 varies with the current passing in the line 27, and hence with the load on the motor.

In the form of my invention shown in Fig. 3 the electromagnet 26' is placed between the disks 11 and 12 on prolongation of the shaft 13, and the energization of the electromagnet tends to draw the disks 11 and 12 together.

It will be readily apparent that in all of the forms of my invention disclosed the operation of the apparatus is independent of the direction of rotation of the motor-shaft and that the reversal of the direction of rotation of the motor-shaft will cause a reversal of the direction of rotation of the driven shaft.

As the pressure between the driving-disk and the driven disk in all the forms of my invention specifically illustrated and described varies with the load on the motor, no real operative or active engagement exists between a driving-disk and the coöperating driven disk, except when the electromagnet 26 or 26' is energized, as otherwise pressure between the disks is too slight to transmit any load.

While I have illustrated and described the best forms of my invention which are now known to me, I do not intend to be limited to the exact construction disclosed, and many variations of structure and arrangement may be made without departing from the spirit of my invention.

What I claim as new, and desire to secure by Letters Patent of the United States, is—

1. In combination, a motor, a friction-disk driven thereby, another friction-disk in rolling engagement with the first, and electromagnetic means for automatically regulating the pressure between the disks in accordance with the load transmitted by the disks.

2. In combination, a pair of disks having their axes at right angles, one of the disks frictionally driving the other, and electromagnetic means for automatically varying the pressure between the disks in accordance with the power transmitted.

3. In combination, a frictional driving-gear, a driven gear turning at a different rate of speed from the driving-gear, and electromagnetic means for automatically varying the pressure between the disks in accordance with the power transmitted.

4. In combination, a motor, a shaft, a pair of friction-gears connecting the motor and the shaft, and automatic electromagnetic means for varying the pressure between the gears as the load on the motor varies.

5. In combination, a pair of friction-gears, and electromagnetic means for automatically forcing them together with a pressure varying with the load transmitted.

6. In combination, an electric motor, a pair of members having non-coincident axes, one of said members being driven by the motor and frictionally driving the other, and means operated by the current of the motor for forcing the members together.

7. The combination of an electric motor, a pair of friction-gears driven thereby, and an electromagnet for varying the pressure between said gears, said electromagnets being energized by the current of the motor.

8. In combination, an electric motor, a friction-disk driven thereby, said friction-disk being made out of yielding material, and clamping means operated by the motor-current for axially compressing said disk and hence increasing its diameter.

9. In combination, a pair of friction-gears, and electromagnetic means for automatically forcing them together with a pressure varying with the load transmitted by the gears.

10. The combination of a friction-disk, a friction-roller placed to engage the same, with electromagnetic means for automatically forcing one of said parts toward the other with a pressure proportional to the power transmitted by said parts, substantially as described.

11. The combination of a friction-disk, a friction-roller placed to engage the same, with electromagnetic means for automatically forcing the roller toward the disk with a pressure proportional to the power transmitted through the said parts, substantially as described.

12. The combination of a friction-disk, a friction-roller, driving means connected to one of said parts and driven mechanism connected to the other, with electromagnetic means for automatically forcing the roller and the disk together when the driving means is operated, substantially as described.

13. The combination of a friction-disk, a friction-roller normally out of active engagement with the same, driving and driven mechanism respectively connected to said two parts, said driving mechanism including electromagnetic means for automatically forcing the roller against the disk under operating conditions, substantially as described.

14. In combination, a driving member, a driven member in engagement therewith, and electromagnetic means for forcing the members together with a pressure proportional to the product of the speed with which the driving member moves into the retarding force exerted on it by the driven member.

15. In combination, a friction-disk, a friction-roller normally out of operative engagement with the same, driving and driven mechanism respectively connected to said disk and roller, and means controlled by the energization of the driving mechanism for automatically forcing the roller into operative engagement with the disk.

In witness whereof I have hereunto set my hand this 4th day of September, 1902.

ALEXANDER CHURCHWARD.

Witnesses:
 THOS. K. HENDERSON,
 L. C. FOSS.